United States Patent
Janvier et al.

(10) Patent No.: US 8,556,736 B2
(45) Date of Patent: Oct. 15, 2013

(54) BALL COUPLING DEVICE WITH HINGED CONNECTION FOR TWO SLIDING SHAFTS

(71) Applicant: ZF Systemes de Direction Nacam S.A.S., Vendome (FR)

(72) Inventors: Amaud Janvier, Saint Leonard en Beauce (FR); Christophe Bahr, Belo Horizonte (BR)

(73) Assignee: ZF Systems de Direction Nacam S.A.S., Vendome (FR)

( * ) Notice: Subject to any disclaimer, the term of this patent is extended or adjusted under 35 U.S.C. 154(b) by 0 days.

(21) Appl. No.: 13/709,829

(22) Filed: Dec. 10, 2012

(65) Prior Publication Data

US 2013/0095934 A1  Apr. 18, 2013

Related U.S. Application Data

(62) Division of application No. 12/997,533, filed as application No. PCT/FR2008/000874 on Jun. 20, 2008.

(51) Int. Cl.
*F16C 3/035* (2006.01)

(52) U.S. Cl.
USPC .............................. 464/167; 384/10

(58) Field of Classification Search
USPC ............ 464/167; 403/322.2; 384/10, 49
See application file for complete search history.

(56) References Cited

U.S. PATENT DOCUMENTS

| | | | |
|---|---|---|---|
| 6,343,993 B1 | 2/2002 | Duval et al. | |
| 6,474,868 B2 | 11/2002 | Geyer et al. | |
| 7,322,607 B2 | 1/2008 | Yamada et al. | |
| 7,416,216 B2 | 8/2008 | Shoda et al. | |
| 2005/0104354 A1 | 5/2005 | Yamada et al. | |
| 2005/0257639 A1 | 11/2005 | Yamada | |

(Continued)

FOREIGN PATENT DOCUMENTS

| | | |
|---|---|---|
| EP | 1 065 397 A1 | 1/2001 |
| EP | 1 635 081 A1 | 3/2006 |
| FR | 2 795 786 A1 | 1/2001 |

OTHER PUBLICATIONS

International Search Report and Written Opinion completed Mar. 4, 2009 and mailed Mar. 19, 2009 from corresponding International Application No. PCT/FR2008/000874, filed Jun. 20, 2008 (11 pages).

(Continued)

*Primary Examiner* — Gregory Binda
*Assistant Examiner* — Matthieu Setliff
(74) *Attorney, Agent, or Firm* — Klein, O'Neill & Singh, LLP (57) ABSTRACT

A device for coupling an inner shaft and an outer shaft includes balls arranged in rows between axial grooves of the inner shaft and axial grooves of the outer shaft, enabling the shafts to slide in the direction of a common axis. Each row of balls is maintained by a double elastic member that bears in the groove of one of the inner or outer shafts and urges the balls along two rolling tracks so that they come into contact with the groove of the other of the inner and outer shafts. The two rolling tracks are hinged through a convex pivot surface and a corresponding concave support face of one of the inner and outer shafts, and a difference between the radii of the pivot surface and the support face defines two contact areas and a pivot axis parallel to the common axis.

19 Claims, 9 Drawing Sheets

(56) References Cited

U.S. PATENT DOCUMENTS

2006/0039747 A1  2/2006  Shoda et al.
2006/0053934 A1  3/2006  Bahr et al.
2006/0181069 A1  8/2006  Yamada
2006/0252559 A1  11/2006  Yamada

OTHER PUBLICATIONS

Office Action mailed Mar. 8, 2012 from corresponding U.S. Appl. No. 12/997,533, filed Dec. 10, 2010.
Final Office Action mailed Aug. 2, 2012 from corresponding U.S. Appl. No. 12/997,533, filed Dec. 10, 2010.
Notice of Allowance mailed Nov. 21, 2012 from corresponding U.S. Appl. No. 12/997,533, filed Dec. 10, 2010.

BALL COUPLING DEVICE WITH HINGED CONNECTION FOR TWO SLIDING SHAFTS

CROSS-REFERENCE TO RELATED APPLICATION(S)

This is a divisional application of Ser. No. 12/997,533, filed Dec. 10, 2010, now U.S. Pat. No. 8,398,496, which is a national phase application under 35 U.S.C. §371 of PCT Application No. PCT/FR2008/000874, filed Jun. 20, 2008, the contents of each of which are expressly incorporated herein by reference.

FIELD OF ART

The invention relates to a device for rotatably coupling two sliding shafts along the common axis thereof. The coupling device of the invention particularly applies to an automotive vehicle steering column, by adapting it to the intermediate column portion connected to the steering gear case or to the upper column portion connected to the steering wheel.

BACKGROUND

In the more particular case of the intermediate axis, the latter has a Cardan joint at each end: one Cardan joint is connected to the motion input of the steering gear case, and the other Cardan joint is connected to the upper column portion. In order to have correct steering of current automotive vehicles, it is required that the length of the intermediate axis be able to vary and adapt to the oscillations of the front gear of the vehicle, due to the profile and the surface condition of the road carpet. This characteristic is also required in order to make the assembling to the rack pinion easier, and to absorb motions upon a frontal impact of the vehicle.

The intermediate axis should therefore have first a variable length, that is it should have a sliding function of two shafts with respect to each other along the column axis thereof, which is the intermediate portion axis. Moreover, a transmission function for the rotation movement between the two shafts and for the torque necessary for handling the steering is required.

There are numerous sliding shaft coupling devices, which enable to combine the passing of the torque between the two shafts through splines which are provided on each of the two shafts with conjugated profiles. However, this type of device has a clearance after an endurance cycle equivalent to the service life of a vehicle, which is the one required for current cars. In order to delay the onset of such clearance, adjusting the sliding of both shafts upon manufacture is relatively tight, which requires upon the line assembly a quite high axial stress, hence a longer assembly time and more laboriousness upon such mounting.

Such adjustment should be accurate in order to enable operational axial movements to be correctly absorbed. Except upon the passing of the torque, the axial stress is a function of the torque being transmitted, the sliding stress related to the torque being transmitted and the friction coefficient increases, and then there is a sudden axial release, causing jerks which prevent a good sliding adjustment with reduced clearance to be maintained; and being harmful for a good driving feeling.

There are also coupling devices which use plastic injection on splined portions which are part of a male metal shaft and a female metal tube. This solution raises issues for absorbing axial movements under high torques; the sliding stresses increase proportionally to the friction forces between the two portions. Besides, the plastic injection wear leaves clearances. As a last solution, rolling elements and strain springs can be introduced between the shaft and the tube. This satisfying solution for a smooth sliding raises issues of angular rigidity because it is directly proportional to the stiffness and preloading of the springs.

SUMMARY

The object of the present invention is to provide a coupling device for sliding shafts which avoids the previous drawbacks, that is a device which requires an axial stress not related to the torque to be transmitted. The axial stress should therefore experience a very small increase when the torque to be transmitted increases while having a strong angular rigidity of the transmission. Further, there should not be any clearance after the endurance cycle and the coupling device of both shafts should be able to be easily mounted in the possible existing overcrowdings on automotive vehicles and this with a reduced axial stress upon assembling.

More precisely, the object of the invention is:
reducing contact pressures due to the transmitted torque, in order to improve the service life of the product and maintain the initial characteristics;
making the assembly easier and absorbing the size and geometry tolerances of the different components;
not biasing the elastic member too much: and
minimising the sliding stress variation and improving the characteristics of a prior application on the name of the Applicant NACAM.

The invention relates to a coupling device for two shafts: an inner shaft and an outer shaft which slide into each other in the direction of the common axis thereof. Said coupling device for both shafts comprises balls, which are provided between the inner shaft and the outer shaft.

In the coupling device, each of said balls is arranged, in the one hand, in a concave portion of the inner shaft and, on the other hand, in a concave portion of the outer shaft.

Each of said balls moves along two rolling tracks arranged on either side of a median plan going through the common axis and the centre of said balls. Each of the two rolling tracks cooperates with the concave portion of one of the two shafts, which are all parallel to the common axis. Each of the two rolling tracks is pushed by an elastic member bearing in said concave portion, each of said balls moving directly against the concave portion of the other shaft.

Each of the two rolling tracks has a bearing portion with a bearing side of each of said balls, and a pivot portion with a rounded pivot side applied against a rounded support side of the corresponding concave portion of the shaft. According to an essential characteristic of the invention, the radius of the support side of the shaft is different from the radius of the pivot side of the rolling track, in order to have two contact areas which define the position of a joint axis of the pivot being parallel to the common axis.

The mounting is carried out such that at rest, when there is no torque transmission, and in operation, when there is a torque transmission, each of said balls is always in contact on either side of the median plan, through a bearing area with the corresponding rolling track arranged in one of the two shafts, and through a bearing area with the concave portion of the other shaft.

According to some embodiments of the invention, the radius of the concave support side of the shaft is smaller than the radius of the convex pivot side of the rolling track; and in other embodiments, the radius of the support side of the shaft is convex and larger than the radius of the concave pivot side of the rolling track. In all these embodiments and for each of the two rolling tracks, the radii of the support side of the shaft and the pivot side of the rolling track can be constant or progressive. Further, the bearing portion has a bearing side of the balls, which can be plane, convex, concave or with double concavity.

In order to increase the operating safety of the coupling device of the invention, male grooves and female grooves, having conjugated profiles with some clearance, are arranged on the inner shaft and on the outer shaft, such that in case the balls are lost, the torque can still be transmitted between the inner shaft and the outer shaft.

Several structures of the coupling device can be designed. In one structure, the elastic member(s) is or are provided in the inner shaft. In another structure, the elastic member(s) is or are provided in the outer shaft.

In another structure, some of the elastic members are provided in the inner shaft and the others in the outer shaft.

In a particular arrangement of the invention, the coupling device has the balls being located in several axial rows.

For each row of balls, there is provided in the outer shaft a concave portion having the shape of an axial groove, the section of which comprises two concave sides being tilted with respect to each other, which come into contact with the balls.

For each row of balls, there is provided in the inner shaft a concave portion having the shape of an axial groove, the section of which comprises a bottom and two flanks, the bottom being substantially perpendicular to the median plan going through the common axis and the axis of the centres of the balls in said row.

For each row of balls, two rolling tracks are arranged on either side of the median plan and cooperate with the concave portion having the shape of an axial groove of the inner shaft. Each rolling track has the shape of an axial bar, the section of which has a bearing portion and a pivot portion.

The bearing portion has a bearing side determined to come into contact with the balls. The pivot portion has a rounded shape with a convex pivot side, which cooperates with a concave rounded support side, joining the bottom and the corresponding flank of the axial groove, in order to have two contact areas determining the position of the joint axis of the pivot being parallel to the common axis. Each of the two rolling tracks is pushed by a spring which bears on the bottom of the axial groove.

In another particular arrangement of the invention, the coupling device has the balls being arranged in several axial rows.

For each row of balls, there is provided in the inner shaft a concave portion having the shape of an axial groove, the section of which comprises two concave sides being tilted with respect to each other, which come into contact with the balls.

For each row of balls, there is provided in the outer shaft a concave portion having the shape of an axial groove, the section of which comprises a bottom and two flanks, the bottom being substantially perpendicular to the median plan going through the common axis and the axis of the centres of the balls in said row.

For each row of balls, two rolling tracks are arranged on either side of the median plan and cooperate with the concave portion having the shape of an axial groove of the outer shaft. Each rolling track has the shape of an axial bar, the section of which has a bearing portion and a pivot portion.

The bearing portion has a bearing side determined to come into contact with the balls. The pivot portion has a rounded shape with a convex pivot side, which cooperates with a concave rounded support side joining the bottom and the corresponding flank of the axial groove, in order to have two contact areas determining the position of the joint axis of the pivot being parallel to the common axis. Each of the two rolling tracks is pushed by a spring which bears on the bottom of the axial groove.

In another particular arrangement of the invention, the coupling device has the balls being arranged in several axial rows.

For each row of balls, there is provided in the outer shaft a concave portion having the shape of an axial groove, the section of which comprises two concave sides being tilted with respect to each other, which come into contact with the balls.

For each row of balls, there is provided in the inner shaft a concave portion having the shape of an axial groove, the section of which comprises a bottom and two flanks, the bottom being substantially perpendicular to the median plan going through the common axis and the axis of the centres of the balls in said row.

For each row of balls, two rolling tracks are arranged on either side of the median plan and cooperate with the concave portion having the shape of an axial groove of the inner shaft. Each rolling track has the shape of an axial bar, the section of which has a bearing portion and a pivot portion.

The bearing portion has a bearing side determined to come into contact with the balls. The pivot portion has a rounded shape with a concave pivot side, which cooperates with a convex rounded support side joining the bottom and the corresponding flank of the axial groove, in order to have two contact areas determining the position of the joint axis of the pivot being parallel to the common axis. Each of the two rolling tracks is pushed by a spring which bears on the bottom of the axial groove.

In another particular arrangement of the invention, the coupling device has the balls being arranged in several axial rows.

For each row of balls, there is provided in the inner shaft a concave portion having the shape of an axial groove, the section of which comprises two concave sides being tilted with respect to each other, which come into contact with the balls.

For each row of balls, there is provided in the outer shaft a concave portion having the shape of an axial groove, the section of which comprises a bottom and two flanks, the bottom being substantially perpendicular to the median plan going through the common axis and the axis of the centres of the balls in said row.

For each row of balls, two rolling tracks are arranged on either side of the median plan and cooperate with the concave portion having the shape of an axial groove of the outer shaft. Each rolling track has the shape of an axial bar, the section of which has a bearing portion and a pivot portion.

The bearing portion has a bearing side determined to come into contact with the balls. The pivot portion has a rounded shape with a concave pivot side which cooperates with a convex rounded support side joining the bottom and the corresponding flank of the axial groove, in order to have two contact areas determining the position of the joint axis of the pivot being parallel to the common axis.

Each of the two rolling tracks is pushed by a spring which bears on the bottom of the axial groove.

According to different embodiments of the invention, each of the two rolling tracks is pushed by an elastic member which is a spring bearing on the bottom of the axial groove.

The spring is made of a body provided with elastic members, and comprising an axial edge on either side and a staple at each axial end; said body being mounted in the bottom of the corresponding concave portion of the shaft and having a shape conjugated with said bottom, that is bulged or convex, having at each transverse end a concave shape receiving the corresponding axial edge of said spring, of which both staples hold on the corresponding shaft. The elastic members are transverse tabs arranged directly by cutting the body, said tabs being held alternatively on one axial edge, then on the other edge.

In a particularly well-balanced assembly of the coupling device, the balls are arranged in three axial rows. The axial rows are transversely located at 120° from one another. The inner shaft is provided with three axial grooves, the axial grooves being transversely located at 120° from one another. The outer shaft is provided with three axial grooves, the axial grooves being transversely located at 120° from one another.

In another particularly well-balanced assembly of the coupling device, the balls are arranged in two diametrically opposed axial rows. The inner shaft is provided with two diametrically opposed axial grooves. The outer shaft is provided with two diametrically opposed axial grooves.

In a complete architecture of the coupling device according to the invention, the inner shaft is provided with three axial grooves, the axial grooves being transversely located at 120° from one another. In each axial groove, an elastic member and two rolling tracks having the shape of an axial bar are mounted.

The balls are arranged in three axial rows, the axial rows being transversely located at 120° from one another.

The whole ball sleeve with the rolling tracks and the elastic axial flanges is closed at each axial end by a shoulder and a retaining ring. The retaining ring engages into each of the axial grooves of the inner shaft.

The outer shaft is provided with three axial grooves transversely located at 120° from one another, which slide on the rows of balls. The axial grooves have the desired length for enabling the required axial sliding of the outer shaft and the inner shaft.

The coupling device according to the invention is very well applied either to the intermediate portion of an automotive vehicle steering column, or to the upper portion of an automotive vehicle steering column.

The coupling device of two shafts along the common axis thereof according to the invention has therefore the advantage of always having two bearing areas for each of the two inner and outer shafts and for each row of balls, which are always in contact, even if there is no torque transmission.

Further, there is a reduced axial stress which is necessary upon the line assembly. The accurate adjustment of the coupling device of the invention enables the axial jerks upon driving the vehicle to be avoided, and ensures a good endurance by avoiding the onset of a coupling clearance. Moreover, upon passing of the torque, the axial stress is largely reduced due to the rolling and sliding contact. Finally, the coupling device can be mounted easily in the existing overcrowding of automotive vehicles steering columns.

Other characteristics and advantages of the present invention will appear clearly with the following description of several preferred embodiments of the invention, provided as non-limiting examples, referring to the corresponding appended drawings wherein.

BRIEF DESCRIPTION OF THE FIGURES

DETAILED DESCRIPTION

The invention relates to a rotatably coupling device of two shafts which slide into each other along the common axis thereof.

Figure 1:
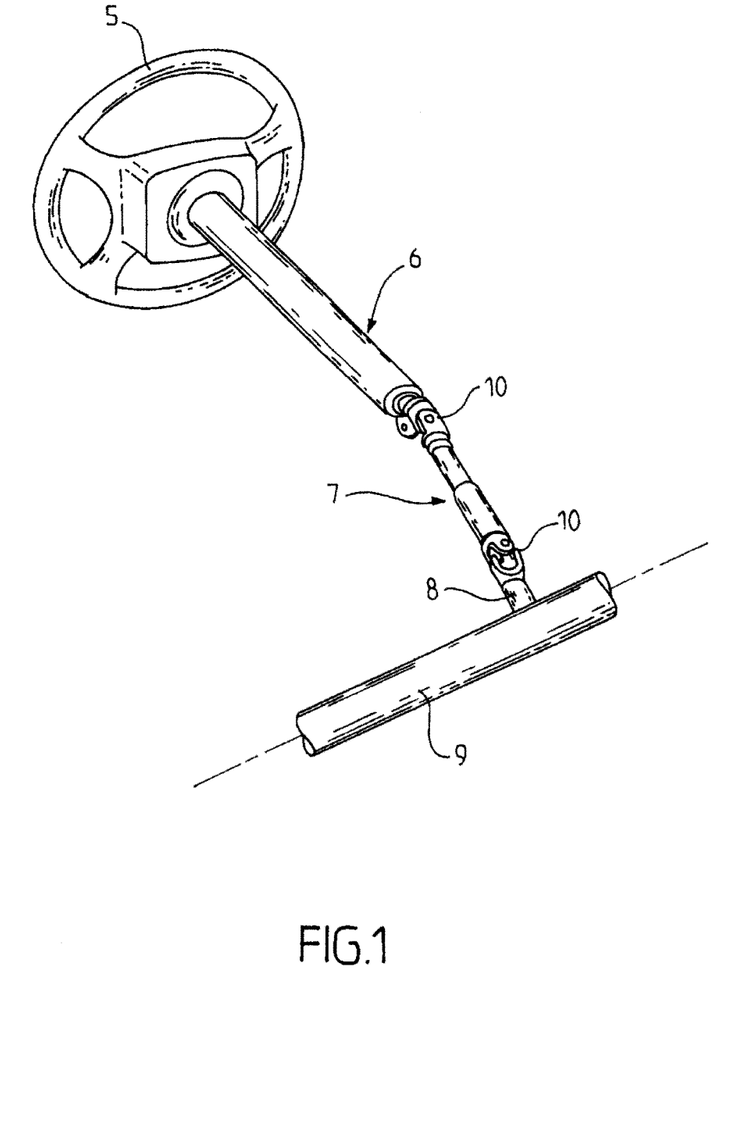
FIG. 1 is a schematic perspective view of an automotive vehicle steering system, wherein the coupling device of the invention is applied to the intermediate column portion.

This coupling device can be particularly well applied to an automotive vehicle steering system, as the one schematically depicted in FIG. 1.

The depicted steering system comprises a steering column with an upper column portion 6 also known as column top, and an intermediate column portion 7 also known as intermediate axis.

The upper column portion 6 is connected through the upper end thereof to the steering wheel 5, and through the lower end thereof to the intermediate column portion 7.

The intermediate column portion 7 is connected through the upper end thereof to the upper column portion 6, and through the lower end thereof to the steering gear case 8 of the steering rod 9.

The intermediate column portion 7 is connected et each of the ends thereof through a Cardan joint referenced as 10 for the upper column portion 6, and also referenced as 10 for the steering gear case 8.

In the following part, the description relates to a coupling device which is arranged in the intermediate column portion 7. The coupling device of the invention can also be arranged in the upper column portion 6.

Figure 2:
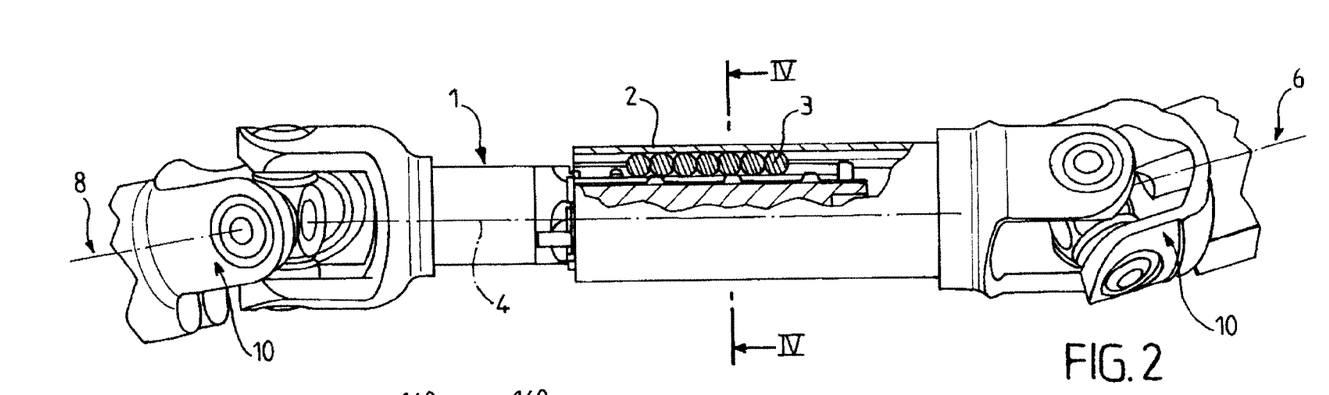
FIG. 2 is an axial view of the intermediate portion of the automotive vehicle steering system of FIG. 1, wherein an embodiment of the invention is depicted in a partial axial section view.
Figure 3:
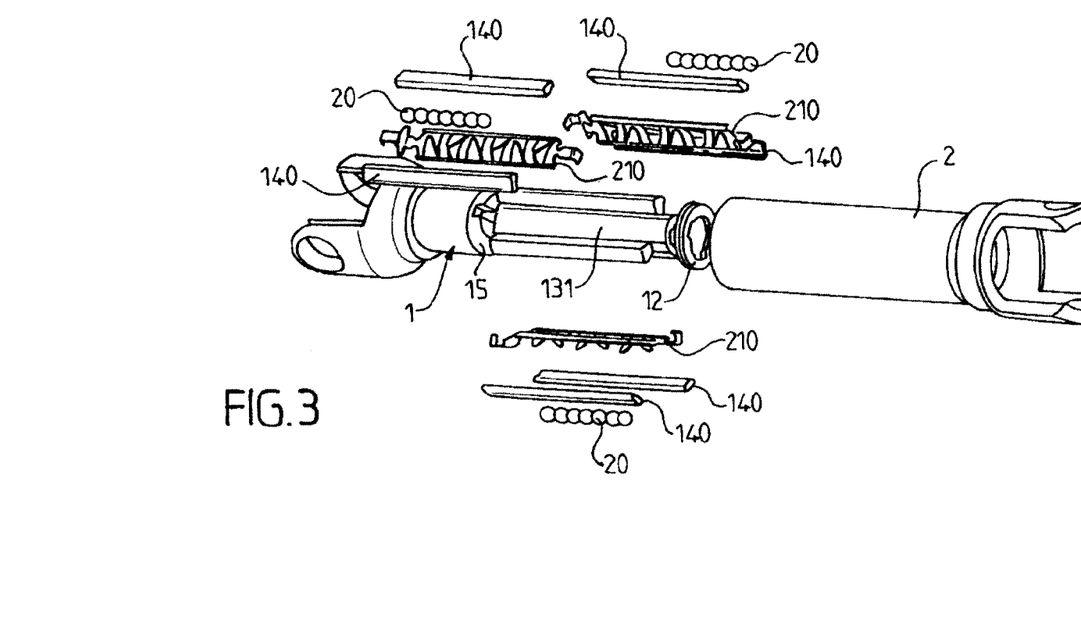
FIG. 3 is an exploded perspective view of the whole coupling device of FIG. 2.

An inner shaft 1 and an outer shaft 2 slide into each other along the direction of the common axis 4 thereof, which is depicted in FIGS. 2 and 3. The coupling device of both shafts comprises balls 3 in different embodiments described below. The balls 3 are arranged between the inner shaft 1 and the outer shaft 2. In the coupling device of the invention, each of said balls 3 is arranged, on the one hand, in a concave portion of the inner shaft 1, and, on the other hand, in a concave portion of the outer shaft 2.

Each of said balls 3 moves along two rolling tracks, which cooperate with the concave portion of one of the two shafts and which pivot around a joint axis. Each rolling track and the corresponding joint axis are parallel to the common axis 4. Each of the two rolling tracks is pushed by an elastic member, which is arranged and bears in said concave portion. Each of said balls 3 moves directly against the concave portion of the other shaft.

The coupling device according to the invention is arranged such that at rest, when there is no torque transmission, and in operation, when there is a torque transmission, the balls 3 are always in contact. On either side of a median plan going through the centre of the balls 3 and the common axis 4, each of the balls 3 is always in contact through a bearing area with the corresponding rolling track arranged in one of the two shafts, and through a bearing area with the concave portion of the other shaft.

The whole intermediate column portion 7 in an axial view is depicted in FIG. 2. The inner shaft 1 and the outer shaft 2 slide with the balls 3 along the common axis 4 thereof. The intermediate column portion 7 is connected to the steering gear case 8 through the Cardan joint 10, and it is connected to the upper column portion 6 through the Cardan joint 10.

Figure 4:
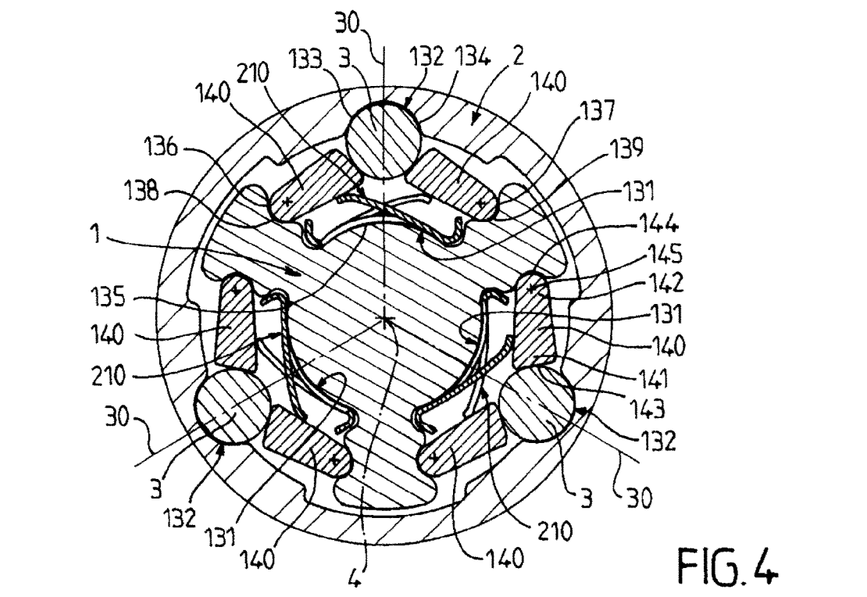
FIG. 4 is a cross-section along IV-IV of FIG. 2.

The coupling device, represented in an exploded view in FIG. 3 and in cross-section in FIG. 4, comprises balls 3 which are arranged in three axial rows 20. The axial rows 20 are transversely located at 120° from one another. The inner shaft 1 is provided with three axial grooves 131, which are transversely located at 120° from one another. The outer shaft 2 is provided with three axial grooves 132, which are transversely located at 120° from one another.

For each row 20 of balls 3, there is provided in the outer shaft 2 a concave portion having the shape of an axial groove 132, the section of which comprises two concave sides 133, 134 being tilted with respect to each other, which come into contact with the balls 3.

For each row 20 of balls 3, there is provided in the inner shaft 1 a concave portion having the shape of an axial groove 131, the section of which comprises a bottom 135 and two flanks 136, 137. The bottom 135 is substantially perpendicular to the median plan 30 going through the common axis 4 and the axis of the centres of the balls 3 in said row 20.

For each row 20 of balls 3, there are two rolling tracks 140 which are arranged on either side of the median plan 30. The rolling tracks 140 cooperate with the concave portion having the shape of an axial groove 131 of the inner shaft 1.

Each rolling track 140 has the shape of an axial bar, the section of which has a bearing portion 141 and a pivot portion 142.

The bearing portion 141 has a bearing side 143, which is determined to come into contact with the balls 3. The pivot portion 142 having a rounded shape has a convex pivot side 144, which cooperates with a concave rounded support side 138 or 139 of the axial groove 131. The concave rounded support side 138 joins the bottom 135 and the flank 136 for one of the rolling tracks 140, and the concave rounded side 139 joins the bottom 135 and the flank 137 for the other rolling track 140.

Figure 7:
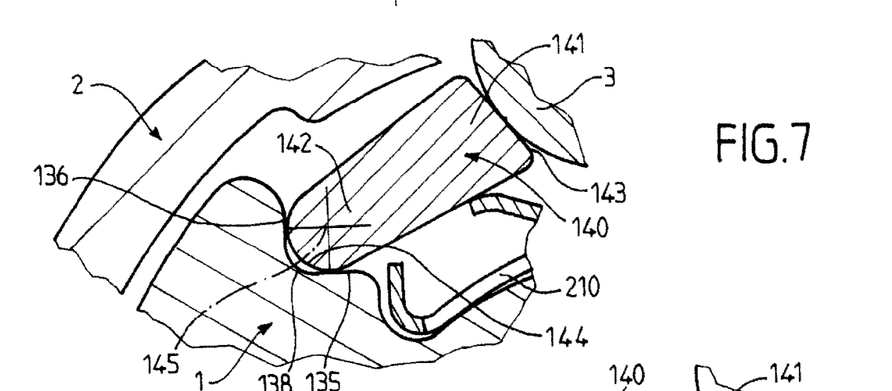
FIG. 7 is an enlarged partial view of FIG. 4 with a rolling track.
Figure 8:
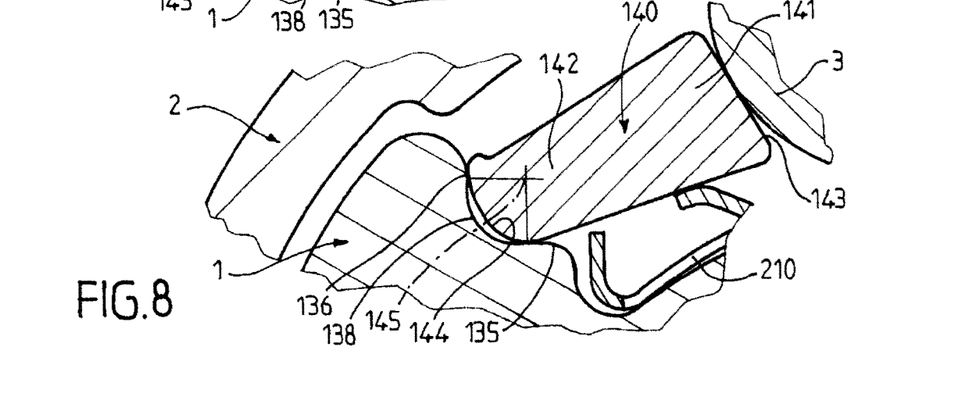
FIG. 8 is a view similar to FIG. 7 of another embodiment of the rolling track.

According to an essential characteristic of the invention shown in detail in FIGS. 7 and 8, the radius of the concave rounded support side 138 and the radius of the concave rounded support side 139 are smaller than the radius of the convex pivot side 144 of the corresponding rolling track 140. This characteristic enables to have two contact areas between the shaft 1 and the corresponding rolling track 140, the action of which determines the position of an axis which is the joint axis 145 of the pivot being parallel to the common axis 4.

Each of the two rolling tracks 140 is pushed by an elastic member 210 which bears on the bottom 135 of the axial groove 131.

Figure 5:
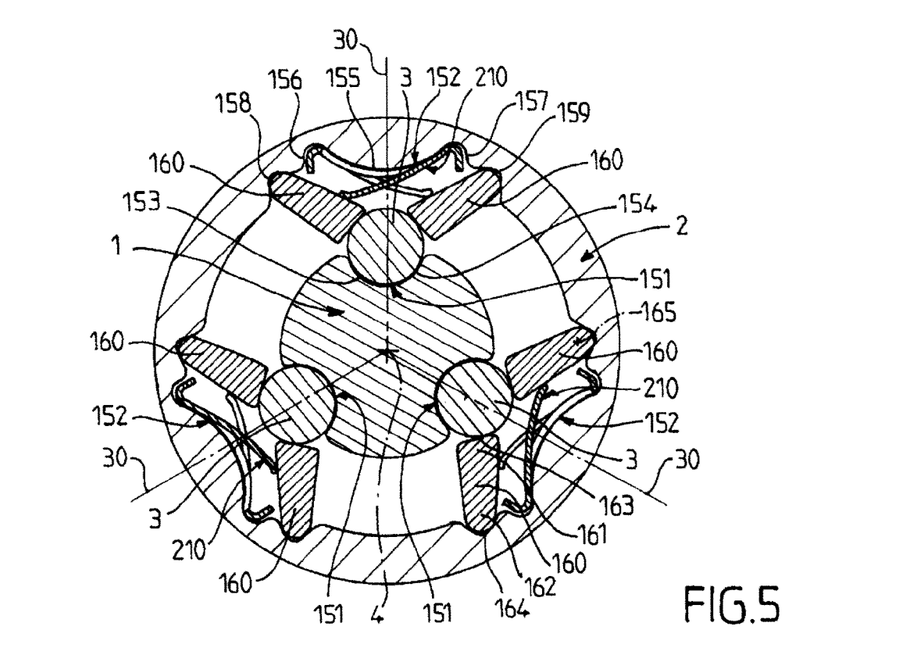
FIG. 5 is a cross-section along the plan of FIG. 4 of another embodiment of the invention.

The coupling device shown in a cross-section according to FIG. 5 comprises balls 3 which are arranged in three axial rows 20.

The axial rows 20 are transversely located at 120° from one another. The inner shaft 1 is provided with three axial grooves 151, which are transversely located at 120° from one another. The outer shaft 2 is provided with three axial grooves 152, which are transversely located at 120° from one another.

For each row 20 of balls 3, there is provided in the inner shaft 1 a concave portion having the shape of an axial groove 151, the section of which comprises two concave sides 153, 154 being tilted with respect to each other, which come into contact with the balls 3.

For each row 20 of balls 3, there is provided in the outer shaft 2 a concave portion having the shape of an axial groove 152, the section of which comprises a bottom 155 and two flanks 156, 157. The bottom 155 is substantially perpendicular to the median plan 30 going through the common axis 4 and the axis of the centres of the balls 3 in said row 20.

For each row 20 of balls 3, two rolling tracks 160 are arranged on either side of the median plan 30. The rolling tracks 160 cooperate with the concave portion having the shape of an axial groove 152 of the outer shaft 2. Each rolling track 160 has the shape of an axial bar, the section of which has a bearing portion 161 and a pivot portion 162.

The bearing portion 161 has a bearing side 163, which is determined to come into contact with the balls 3. The pivot portion 162 having a rounded shape has a convex pivot side 164, which cooperates with a concave rounded support side 158 or 159 of the axial groove 151. The concave rounded support side 158 joins the bottom 155 and the flank 156 for one of the rolling tracks 160, and the concave rounded side 159 joins the bottom 155 and the flank 157 for the other rolling track 160.

According to an essential characteristic of the invention shown in detail in FIGS. 7 and 8, the radius of the concave rounded support side 158 and the radius of the concave rounded support side 159 is smaller than the radius of the convex pivot side 164 of the corresponding rolling track 160. This characteristic enables to have two contact areas between the shaft 2 and the corresponding rolling track 160, the action of which determines the position of an axis which is the joint axis 165 of the pivot being parallel to the common axis 4.

Each of the two rolling tracks 160 is pushed by an elastic member 210 which bears on the bottom 155 of the axial groove 152.

Figure 16:
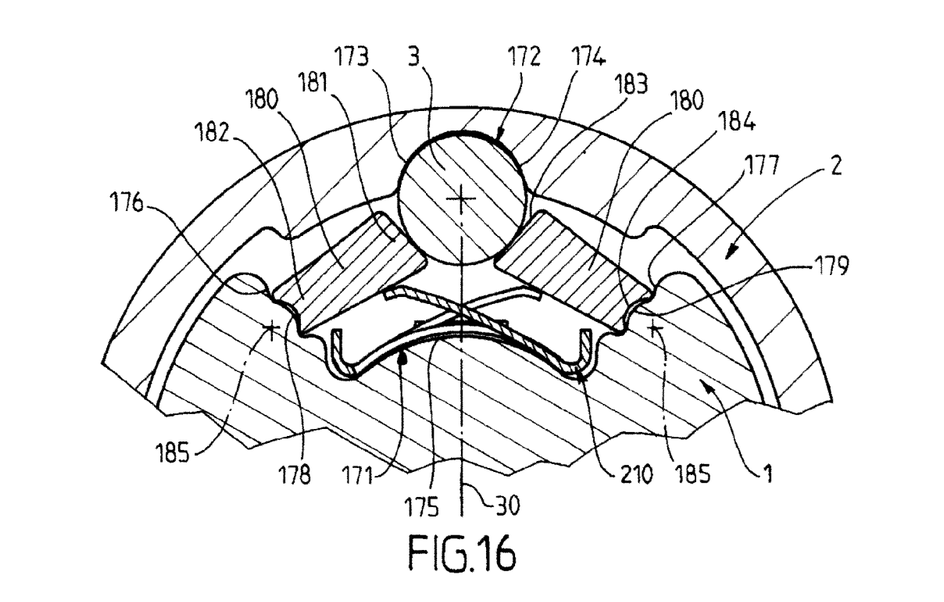
FIG. 16 is an enlarged partial view of the mounting of a row of balls along the plan of FIG. 4, of another embodiment of the invention.

The coupling device shown in cross-section in FIG. 16 comprises balls 3 which are arranged in three axial rows 20.

The axial rows 20 are transversely located at 120° from one another. The inner shaft 1 is provided with three axial grooves 171, which are transversely located at 120° from one another. The outer shaft 2 is provided with three axial grooves 172, which are transversely located at 120° from one another.

For each row 20 of balls 3, there is provided in the outer shaft 2 a concave portion having the shape of an axial groove 172, the section of which comprises two concave sides 173, 174 being tilted with respect to each other, which come into contact with the balls 3.

For each row 20 of balls 3, there is provided in the inner shaft 1 a concave portion having the shape of an axial groove 171, the section of which comprises a bottom 175 and two flanks 176, 177. The bottom 175 is substantially perpendicular to the median plan 30 going through the common axis 4 and the axis of the centres of the balls 3 in said row 20.

For each row 20 of balls 3, two rolling tracks 180 are arranged on either side of the median plan 30. The rolling tracks 180 cooperate with the concave portion having the shape of an axial groove 171 of the inner shaft 1. Each rolling track 180 has the shape of an axial bar, the section of which has a bearing portion 181 and a pivot portion 182.

The bearing portion 181 has a bearing side 183, which is determined to come into contact with the balls 3. The pivot portion 182 having a rounded shape has a concave pivot side 184, which cooperates with a convex rounded support side 178 or 179 of the axial groove 171. The convex rounded support side 178 joins the bottom 175 and the flank 176 for one of the rolling tracks 180, and the convex rounded side 179 joins the bottom 175 and the flank 177 for the other rolling track 180.

According to an essential characteristic of the invention, the radius of the convex rounded support side 178 and the radius of the convex rounded support side 179 is larger than the radius of the concave pivot side 184 of the corresponding rolling track 180. This characteristic enables to have two contact areas between the shaft 1 and the corresponding rolling track 180, the action of which determines the position of an axis which is the joint axis 185 of the pivot being parallel to the common axis 4.

Each of the two rolling tracks 180 is pushed by an elastic member 210 which bears on the bottom 175 of the axial groove 171.

Figure 17:
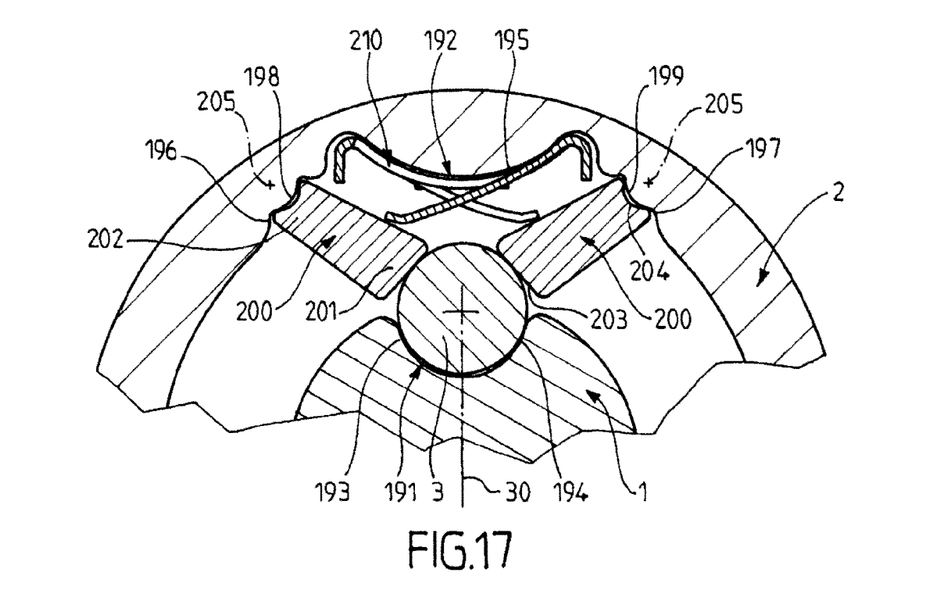
FIG. 17 is a view similar to FIG. 16 of another embodiment of the invention.

The coupling device shown in cross-section in FIG. 17 comprises balls 3 which are arranged in several axial rows 20.

The axial rows 20 are transversely located at 120° from one another. The inner shaft 1 is provided with three axial grooves 191, which are transversely located at 120° from one another. The outer shaft 2 is provided with three axial grooves 192, which are transversely located at 120° from one another.

For each row 20 of balls 3, there is provided in the inner shaft 1 a concave portion having the shape of an axial groove 191, the section of which comprises two concave sides 193, 194 being tilted with respect to each other, which come into contact with the balls 3.

For each row 20 of balls 3, there is provided in the outer shaft 2 a concave portion having the shape of an axial groove 192, the section of which comprises a bottom 195 and two flanks 196, 197. The bottom 195 is substantially perpendicular to the median plan 30 going through the common axis 4 and the axis of the centres of the balls 3 in said row 20.

For each row 20 of balls 3, two rolling tracks 200 are arranged on either side of the median plan 30. The rolling tracks 200 cooperate with the concave portion having the shape of an axial groove 192 of the outer shaft 2. Each rolling track 200 has the shape of an axial bar, the section of which has a bearing portion 201 and a pivot portion 202.

The bearing portion 201 has a bearing side 203, which is determined to come into contact with the balls 3. The pivot portion 202 having a rounded shape has a concave pivot side 204, which cooperates with a convex rounded support side 198 or 199 of the axial groove 191. The convex rounded support side 198 joins the bottom 195 and the flank 196 for one of the rolling tracks 200, and the convex rounded side 199 joins the bottom 195 and the flank 197 for the other rolling track 200.

According to an essential characteristic of the invention, the radius of the convex rounded support side 198 and the radius of the convex rounded support side 199 is larger than the radius of the concave pivot side 204 of the corresponding rolling track 200. This characteristic enables to have two contact areas between the shaft 2 and the corresponding rolling track 200, the action of which determines the position of an axis which is the joint axis 205 of the pivot being parallel to the common axis 4.

Each of the two rolling tracks 200 is pushed by an elastic member 210 which bears on the bottom 195 of the axial groove 192.

Figure 13:
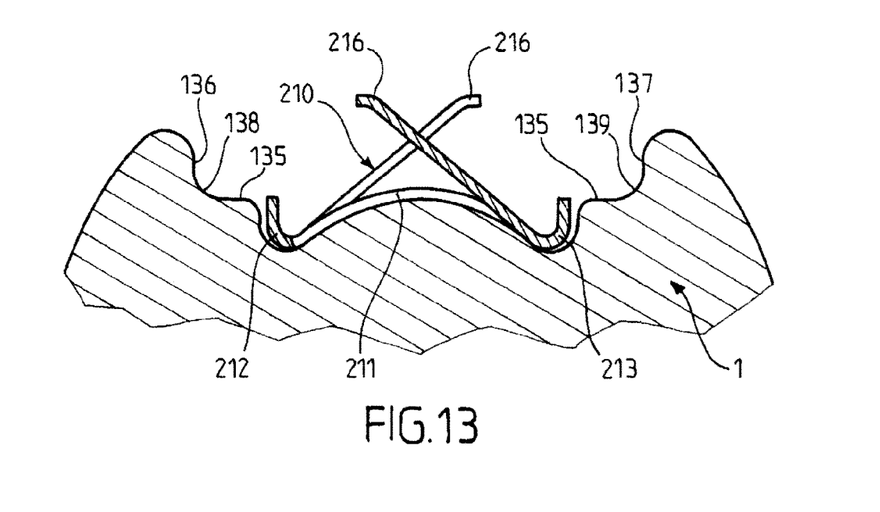
FIG. 13 is a view similar to FIGS. 9 to 12 with an elastic member in a free position.
Figure 14:
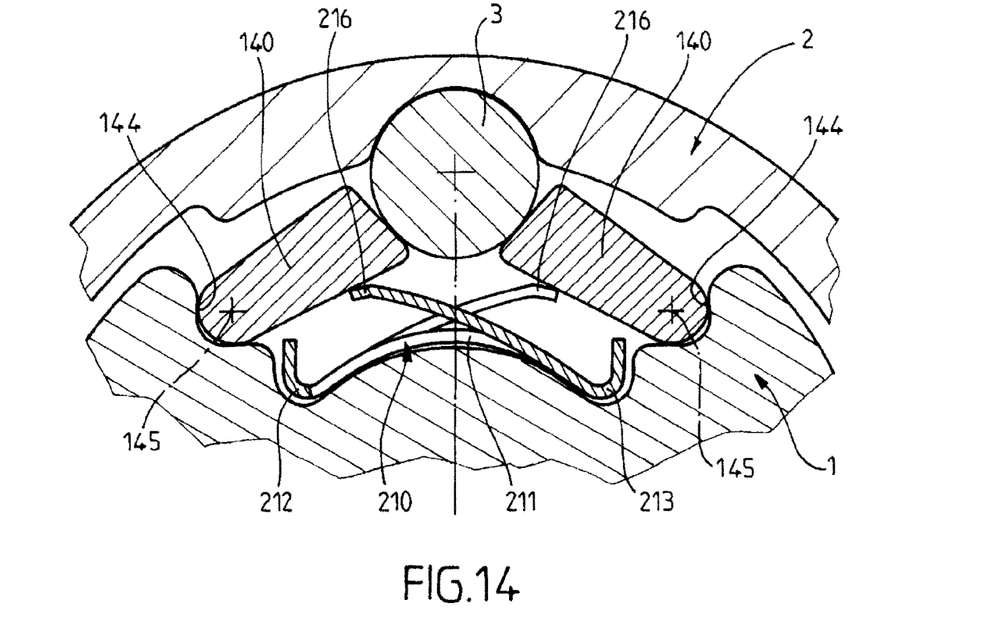
FIG. 14 is a view similar to FIG. 13 with an elastic member in compressed position.
Figure 15:
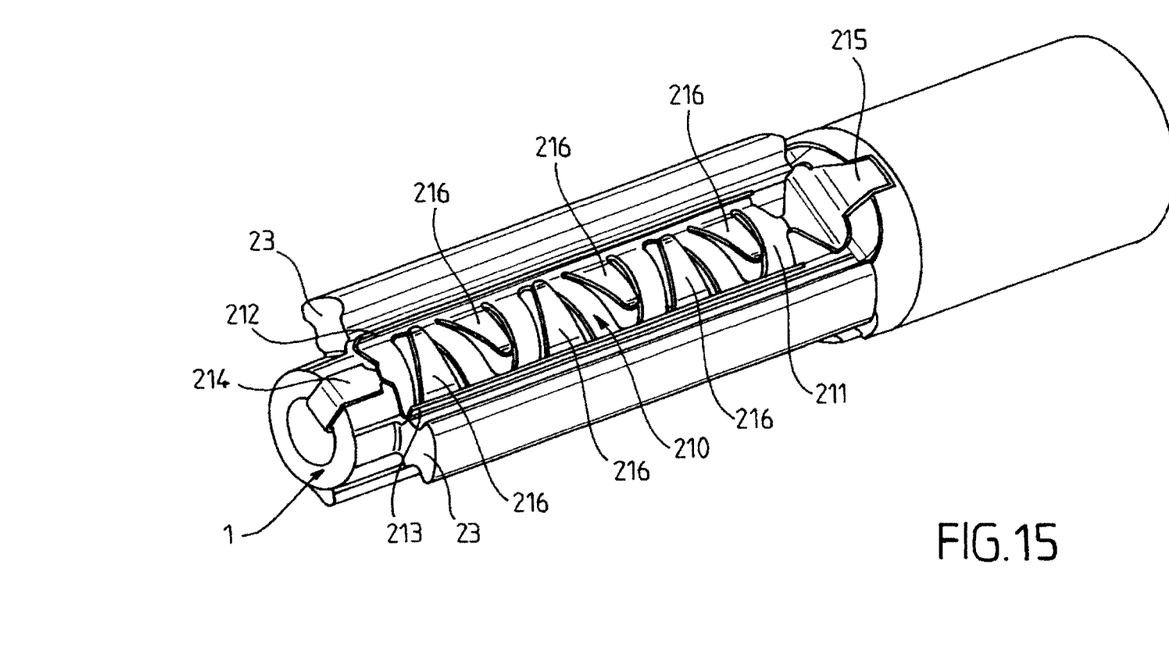
FIG. 15 is a perspective view of the inner shaft and the spring corresponding to FIG. 14.

Whatever the embodiment depicted in FIGS. 2 to 17, each of the two rolling tracks 140, 160, 180, 200 is pushed by an elastic member which is a metal spring 210. The spring 210 is made of an axial body 211 which is provided with elastic members 216. The body 211 comprises on either transverse side an axial edge 212 and 213, as shown in details in FIGS. 13, 14 and 15. The body 211 further comprises at each axial end a staple 214 and 215. The elastic members are transverse tabs 216, which are arranged directly by cutting the body 211. The transverse tabs 216 are held alternately on an axial edge 212, and then on the other axial edge 213. The body 211 is mounted in the bottom 135, 155, 175, 195 of the corresponding concave portion of the relevant shaft, having a shape being conjugated with that of said bottom, that is bulged, in other words convex. Said bottom comprises, at each transverse end, a concave shape receiving the corresponding axial edge 212, 213 of said spring 210, of which both staples 214, 215 hold on the corresponding shaft.

In the embodiments shown in the FIGS., the radius of the support side of the shaft 1 or 2 and the radius of the pivot side of the relevant rolling track have constant values. In other embodiments shown in FIG. 8, the radius of the pivot side is progressive. In other not shown embodiments of the invention, it is the radius of the support side of the shaft 1 or 2 which is progressive. Finally, in other not shown embodiments of the invention, it is the radius of the pivot side and the radius of the support side which are progressive. As particularly shown in FIGS. 6, 7, 8 and 9, each of the two rolling tracks 140, 160, 180, 200 has the bearing portion 141, 161, 181, 201 provided with a bearing side 143, 163, 183, 203 of the balls 3 which is flat. As shown in FIG. 10, the bearing side of the balls is convex, while according to FIG. 11, the bearing side is concave, and according to FIG. 12, the bearing side of the balls has a double concavity.

As shown in FIGS. 3 to 5, the balls 3 can be arranged in three axial rows 20, the axial rows 20 being transversely located at 120° from one another. The inner shaft 1 is provided with three axial grooves 131, 151, 171, 191, the axial grooves 131, 151, 171, 191 being transversely located at 120° from one another. The outer shaft 2 is provided with three axial grooves 132, 152, 172, 192, the axial grooves 132, 152, 172, 192 being transversely located at 120° from one another.

Figure 6:
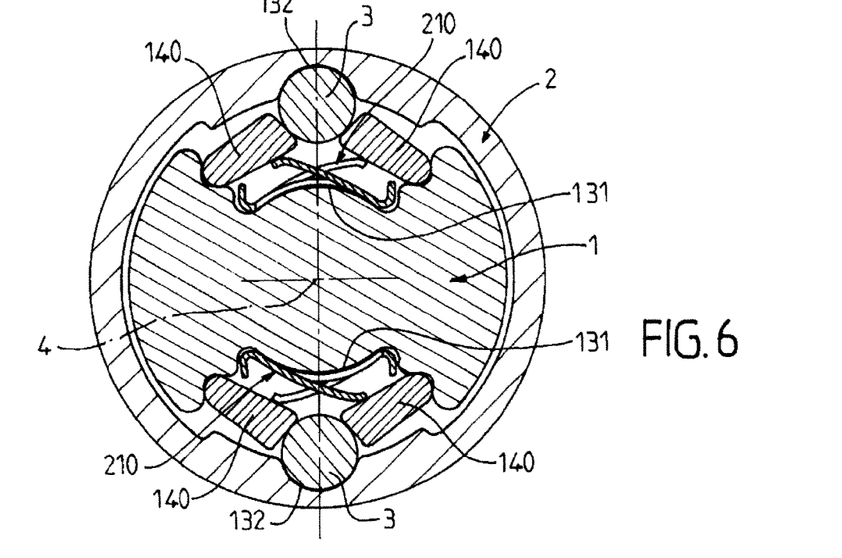
FIG. 6 is a cross-section along the plan of FIG. 4 of another embodiment of the invention.

As is the case for FIG. 6, the balls 3 can be arranged in two diametrically opposed axial rows 20. The inner shaft 1 is provided with two diametrically opposed axial grooves 131, 151, 171, 191; and the outer shaft 2 is provided with two diametrically opposed axial grooves 132, 152, 172, 192.

Figure 9:
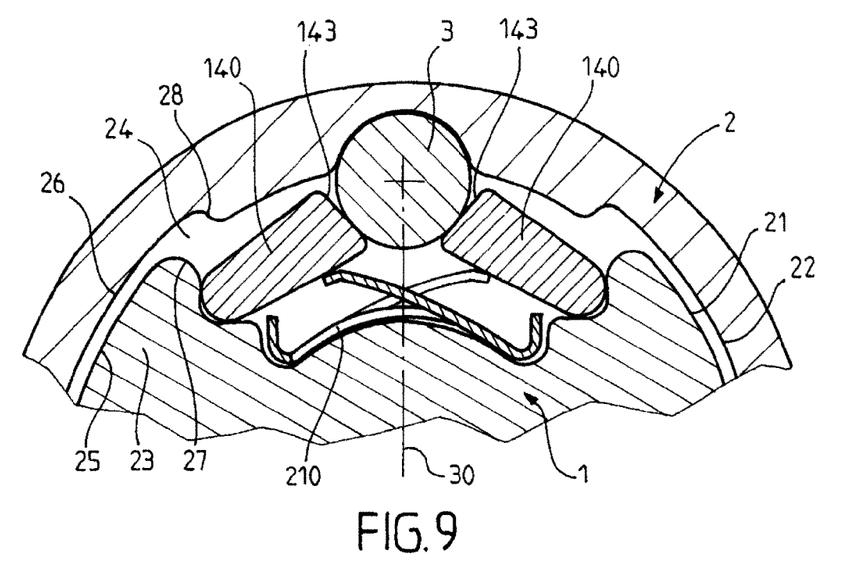
FIG. 9 is an enlarged partial view of the mounting of a row of balls of FIG. 4.
Figure 10:
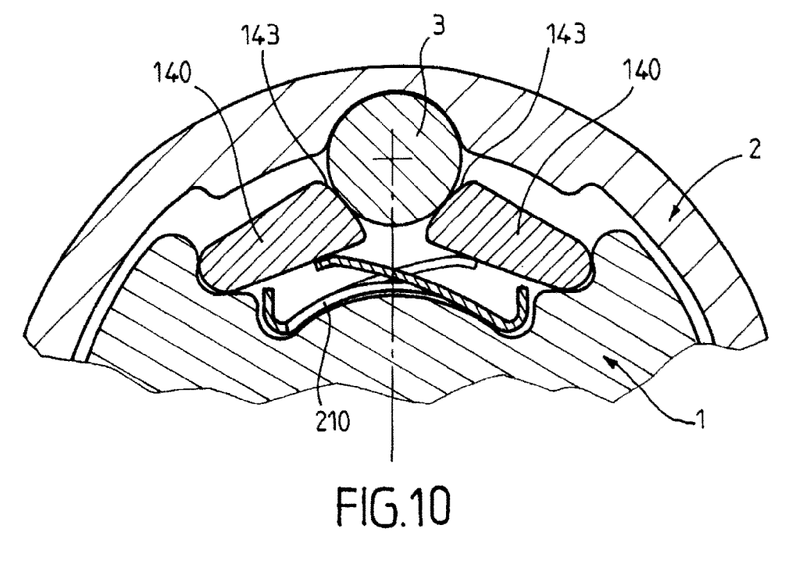
FIG. 10 is a view similar to FIG. 9 with another rolling track according to the invention.
Figure 11:
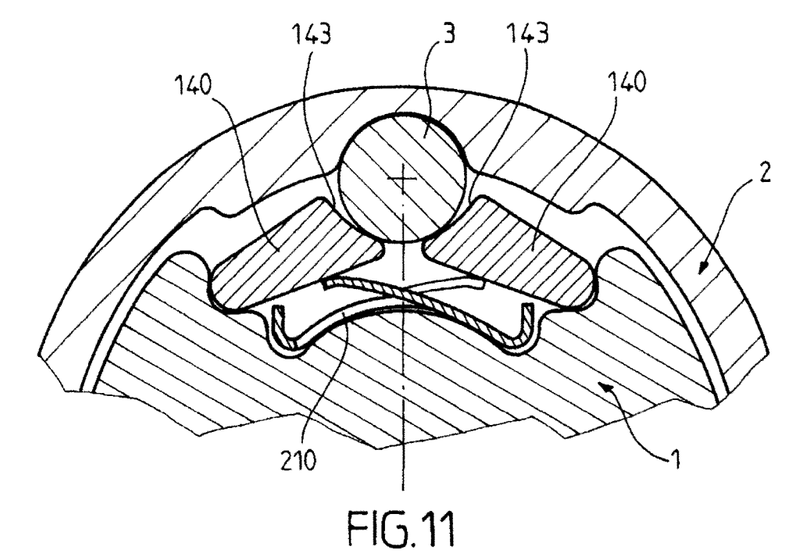
FIG. 11 is a view similar to FIG. 9 with another rolling track according to the invention.
Figure 12:
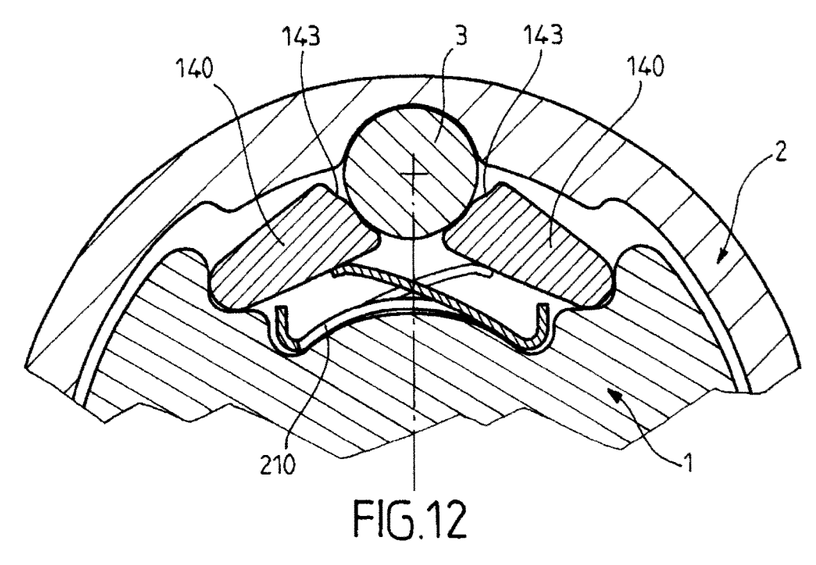
FIG. 12 is a view similar to FIG. 9 with another rolling track according to the invention.

As particularly shown in FIG. 9, male grooves 23 and female grooves 24 having conjugated profiles with some clearance, are provided on the sliding side 21 of the inner shaft 1 and on the sliding side 22 of the outer shaft 2; the male grooves having an apex 25 and two flanks 27, the female grooves 24 having a bottom 26 and two flanks 28. Thus, in case the balls 3 are lost, the torque can still be transmitted between the inner shaft 1 and the outer shaft 2.

As it is particularly the case of FIGS. 4, 6, and 16, the elastic members or springs 210 can be arranged in the inner shaft 1 and push both rolling tracks 140, 180 which cooperate with the inner shaft.

As particularly for FIGS. 5 and 17, the elastic members or springs 210 can be arranged in the outer shaft 2 and push both rolling tracks 160, 200 which cooperate with the outer shaft.

While remaining under the scope of the invention, some of the elastic members or springs 210 can also be arranged in the inner shaft 1, and the others in the outer shaft 2, said elastic members pushing both corresponding rolling tracks, which cooperate with the relevant shaft.

In the embodiment of FIGS. 3, 4 and 16, the inner shaft 1 is provided with three axial grooves 131, 171. The axial grooves 131, 171 are transversely located at 120° from one another. In each axial groove 131, 171, an axial elastic member or spring 210 and two rolling tracks 140, 180 having the shape of an axial bar are mounted.

The balls 3 are arranged in three axial rows 20, which are transversely located at 120° from one another.

The whole assembly of balls 3 with the rolling tracks 140, 180 and the elastic members or springs 210 is closed at each axial end by a shoulder 15 and by a retaining ring 12. The retaining ring 12 engages into each of the axial grooves 131, 171 of the inner shaft 1.

The outer shaft 2 is provided with three axial grooves 132, 172 transversely located at 120° from one another, which slide on the rows 20 of balls 3. The axial grooves 132, 172 should have the desired length in order to enable the required axial sliding of the outer shaft 2 and the inner shaft 1.

The essential characteristics of the invention are reminded thereafter.

The balls are in contact, on the one hand, with one of the shafts and, on the other hand, with both rolling tracks. The rolling tracks are in contact with the other shaft and can pivot in the shaft. The rolling tracks are in contact with elastic members which are intended to maintain the contact between the rolling tracks and the balls at one point.

Upon assembling the system, the elastic members enable the size variations of the different components to be compensated. It can be called tolerance absorption through elastic member deformation.

Upon applying a torque, the load is transmitted from the tube on the shaft through the balls and the rolling tracks. The load application line goes through the centre of the ball and the pivot of the rolling track. Thus, the load is directly taken by the shaft without biasing the elastic member. The angular rigidity is very important and independent of the stiffness of the elastic members.

Upon an axial movement of the tube with respect to the shaft, the sliding stress of the system is a function of the stresses on the balls inserted by the elastic members.

Upon applying a torque, the sliding stress of the system is then a function of stresses on the balls inserted by the elastic members and the torque applied to the system.

What is claimed is:

1. A steering column comprising:
an inner shaft comprising an axial groove;
an outer shaft comprising a bore with an axial groove having the inner shaft disposed therein so that the two axial grooves face one another and the inner and outer shafts defining a common axis;
a row of balls received between the two axial grooves;
the axial groove of one of the inner and outer shafts including two concave support surfaces located on either side of a median plan passing through the common axis and the balls;
a rigid rolling track member comprising a convex pivot portion with a convex pivot surface and a bearing portion with a bearing surface provided on each side of the median plan with the convex pivot surface in contact with the concave support surface and the bearing surface bearing against each of said balls;
an elastic member located in the axial groove of one of the inner and outer shafts and pushing the two rolling track members against the balls such that at rest, when there is no torque transmission, and in operation, when there is a torque transmission, each of said balls simultaneously contacts the two rolling track members and the axial groove of one of the inner and outer shafts; and
wherein the convex pivot surface of each of the two rolling tracks comprises a radius that is greater than a radius of the concave support surface that it contacts so as to define two contact areas that determine a pivot axis parallel to the common axis, the pivot axis being closer to the two contact areas than to the balls.

2. A steering column comprising:
an inner shaft comprising an axial groove located in a bore of an outer shaft comprising an axial groove so that the two axial grooves define a channel and the inner and outer shafts positioned along a common axis; the axial groove of one of the inner and outer shafts including two concave support surfaces located on either side of a raised bottom surface that projects into the channel;
a row of balls received between the two axial grooves in the channel;
a rigid rolling track member comprising a convex pivot portion with a convex pivot surface and a bearing portion with a bearing surface provided in the channel on each side of a median plan defined by a line drawn through the common axis and a center of at least one of the balls with the convex pivot surface in contact with the concave support surface and the bearing surface bearing against each of said balls;
an elastic member located in the channel and in contact with the raised bottom surface pushing the two rolling track members against the balls such that at rest, when there is no torque transmission, and in operation, when there is a torque transmission, each of said balls simultaneously contacts the two rolling track members and the axial groove of one of the inner and outer shafts; and
wherein the convex pivot surface of each of the two rolling tracks comprises a radius that is greater than a radius of the concave support surface that it contacts so as to define two contact areas that determine a pivot axis parallel to the common axis.

3. A steering column comprising an inner shaft and an outer shaft, the inner and outer shafts sliding within each other along a common axis thereof, said steering column comprising one or more coupling interfaces, each comprising:
an axial groove of the inner shaft;
an axial groove of the outer shaft;
a row of balls received between the axial groove of the inner shaft and the axial groove of the outer shaft;
two rigid rolling track members cooperating with the axial groove of one of the inner and outer shafts so as to pivot in the axial groove of said one of the inner and outer shafts about a pivot axis parallel to the common axis, the axial groove of said one of the inner and outer shafts including two concave support faces located on either side of a median plan passing through the common axis and the balls, the two rolling track members being provided on either side of the median plan;

wherein each of the two rolling track members has a bearing portion with a bearing face bearing against each of said balls and a pivot portion with a convex pivot face bearing against a corresponding one of the two concave support faces, the convex pivot face having a radius that is greater than a radius of the corresponding one of the two concave support faces so as to define two contact areas between the convex pivot face and the corresponding one of the two concave support faces, wherein the two contact areas determine the pivot axis, the pivot axis being closer to the contact areas than to each of said balls; and an elastic member that bears in the axial groove of said one of the inner and outer shafts and pushes the two rolling track members against the balls such that at rest, when there is no torque transmission, and in operation, when there is a torque transmission, each of said balls simultaneously contacts the two rolling track members provided in said one of the inner and outer shafts and the axial groove of said other of said inner and outer shafts;

wherein the elastic member being located such that when torque is applied, a load application line goes through the centers of each of the balls and the pivot portion of one of the rolling track members, whereby torque is transmitted between the inner shaft and outer shaft through the balls and the rolling track members.

4. The steering column of claim 3, wherein the radius of the convex pivot face of each of the two rolling track members and the radius of the two concave support faces are constant.

5. The steering column of claim 3, wherein the radius of the convex pivot face of each of the two rolling track members is progressive.

6. The steering column of claim 3, wherein the radius of the convex pivot face of the two rolling track members and the radius of the two concave support faces are progressive.

7. The steering column of claim 3, wherein the bearing face of the bearing portion of each of the two rolling track members is planar.

8. The steering column of claim 3, wherein the bearing face of the bearing portion of each of the two rolling track members is convex.

9. The steering column of claim 3, wherein the bearing face of the bearing portion of each of the two rolling track members is concave.

10. The steering column of claim 3, wherein the bearing face of the bearing portion of each of the two rolling track members has a double concavity.

11. The steering column of claim 3, wherein the elastic member is a spring made of a body provided with elastic elements and comprising an axial edge on either side and a staple at each axial end.

12. The steering column of claim 11, wherein the elastic elements are transverse tabs directly arranged by cutting the body, said tabs holding alternatively on an axial edge and then on the other axial edge.

13. The steering column of claim 3, wherein male axial protrusions and corresponding female axial cavities with conjugated profiles having some clearance are provided on the inner shaft and the outer shaft such that, in case the balls are broken, the torque can still be transmitted between the inner shaft and the outer shaft.

14. The steering column of claim 3, wherein the two rolling track members cooperate with the axial groove of the inner shaft.

15. The steering column of claim 3, wherein the two rolling track members cooperate with the axial groove of the outer shaft.

16. The steering column of claim 3, wherein the one or more coupling interfaces consist of two opposite coupling interfaces.

17. The steering column of claim 3, wherein the one or more coupling interfaces consist of three coupling interfaces arranged at 120° from one another.

18. The steering column of claim 3, wherein the axial groove of said one of the inner and outer shafts has a cross-section including a bottom and two flanks, each of the two flanks provided with a first concave portion joining the bottom and a second concave portion comprising a respective one of the two concave support faces, and wherein the elastic member bears on the bottom and on the first concave portion of each of the two flanks.

19. The steering column of claim 3, wherein the axial groove of said other of the inner and outer shafts has a cross-section comprising two concave sides tilted with respect to one another, which come into contact with the balls.

* * * * *